May 21, 1963 E. MOEBES 3,090,707
PROCESS FOR THE PURIFICATION AND DECOLORIZATION OF
PRE-TREATED TECHNICAL SUGAR SOLUTION
Filed Sept. 15, 1959
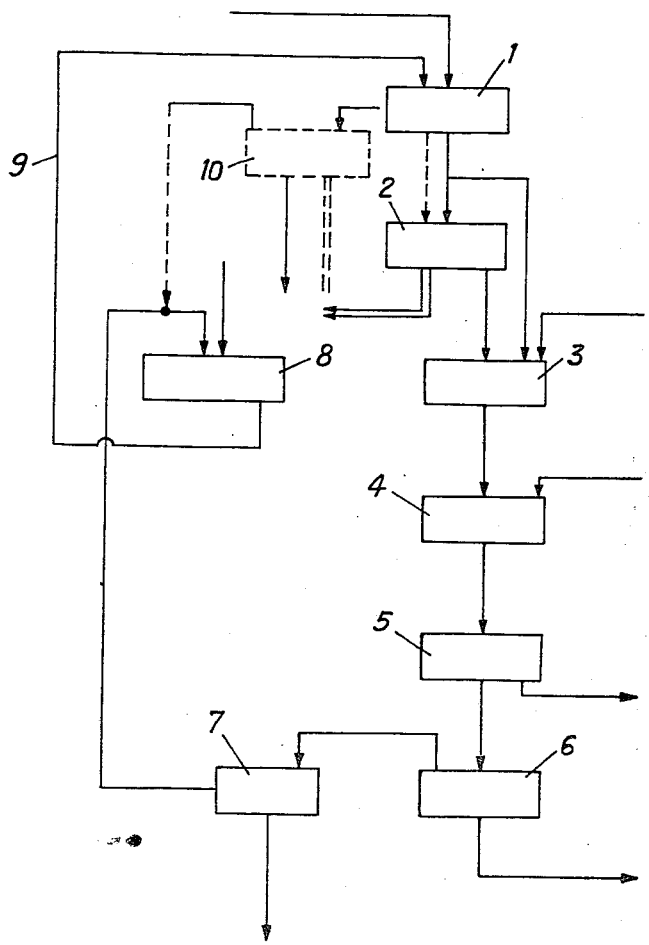
INVENTOR.
ERICH MOEBES
BY

United States Patent Office 3,090,707
Patented May 21, 1963

3,090,707
PROCESS FOR THE PURIFICATION AND DE-
COLORIZATION OF PRE-TREATED TECH-
NICAL SUGAR SOLUTION
Erich Moebes, Leopoldsdorf, Marchfeld, Austria, assignor to Sugar Chemical Co. Etablissement, Vaduz, Liechtenstein, a company of Liechtenstein
Filed Sept. 15, 1959, Ser. No. 840,053
Claims priority, application Switzerland Sept. 23, 1958
9 Claims. (Cl. 127—46)

The present invention relates to a process for the purification and decolorization of pre-treated technical sugar solutions. The purpose of this process is to increase the proportion of sugar which can be recovered from pre-refined technical sugar solutions and so to reduce the proportion of sugar which is lost in the form of molasses, by removal of the cations forming molasses and replacement by those (such as calcium and magnesium) which do not form molasses and also by removal and replacement of the adulterating anions by those which can be partially or completely removed in the following processes.

It is already known to purify technical sugar solutions by preliminary purification with lime and carbon dioxide in known manner followed by treatment by means of anion and cation exchange in hydrogen or hydroxyl ion cycles. In this way the cations and anions are removed from the technical sugar solutions. The process has so far been prevented by the high cost of the regeneration of the ion exchanger used and the necessity of cooling the sugar solution to be treated to below 20°.

It is also known to use one of the above processes with the ion exchangers in the so-called mixed bed process. In this way cooling of the sugar solutions is avoided. The regeneration referred to above is, however, very difficult to carry through, as a result of the need to separate the mixed ion exchangers. It is further known to replace the cations forming the molasses by means of exchanges, first, with ammonium ions and then later by exchanging with calcium ions.

Further, it is already known to carry out the decolorization of technical sugar solutions by means of anion exchangers, which are charged with chloride ions and are regenerated with cooking salt or mineral acids.

The process according to the present invention is characterized in that the pre-refined technical sugar solutions, treated with lime and carbon dioxide in the usual manner, are first led through an anion exchanger which contains one or several anions and immediately afterward are treated in a cation exchanger, which is charged with ammonium ions, whereby the anions of the anion exchanger can be removed from the technical sugar solutions in the following operation, or form salts with alkaline earth metals which have no effect on the recovery of the sugar. Preferably the anion exchanger is charged with sulphate ions. In the technical sugar solutions a proportion of the anions, up to 30-50%, is exchanged for sulphate ions on first passing through the exchanger.

The sugar solutions now contain instead of the organic compounds of alkali and calcium metals, the corresponding sulphates. This sugar solution is next passed through the cation exchanger charged with ammonium ions such that the metal ions present in the sugar solution are exchanged for ammonium ions. This operation can be carried out in the same apparatus, the two exchangers lying one over the other, or mixed together.

The syrup so treated now contains ammonium ions instead of the metallic cations and sulphate ions in place of 30–50° of the original anions, so that the sugar solution now contains, in relation to the salts originally present, 30–50% ammonium sulphate and 50–70% organic ammonium salts.

In addition during the passage through the exchanger containing sulphate ions 50–90% of the dye is exchanged for sulphate ions, so that this syrup has lost 50–90% of its colour after treatment.

The sugar solution so obtained is treated with a small excess of CaO or Ca(OH)$_2$ so that the following reactions result.

(1) $(NH_4)_2SO_4 + Ca(OH)_2 \longrightarrow CaSO_4 + 2NH_4OH$
(2) $2NH_4.R + Ca(OH)_2 \longrightarrow CaR_2 + 2NH_4OH$
(3) $4(NH_4)OH \xrightarrow[-2H_2O]{} 4NH_3 + 2H_2O$ The sulphate ion is introduced in place of the organic anions and is precipitated as calcium sulphate, whilst the organic ammonium compounds are converted into organic calcium compounds. A large part of the organic anions forming molasses are therefore removed and all the alkali ions forming molasses are exchanged for calcium ions which do not form molasses.

The excess calcium hydroxide is salted out with SO$_2$ in known manner and the precipitated calcium sulphate filtered off.

If the exchangers are exhausted by treatment with the pre-refined sugar solution, they are regenerated by treatment with a 5–8% solution of a mixture of 80–90% ammonium sulphate and 10–20% ammonium chloride. The reactions occurring are as follows.

(1) Anion exchanger:

$$2A.R + (NH_4)_2SO_4 \rightarrow A_2SO_4 + 2R.NH_4$$

This solution proceeds to the charged cation exchanger where the following reaction occurs:

$2R.NH_4 + (NH_4)_2SO_4 \rightarrow AK$ (Na; Ca)$\rightarrow$A.NH$_4$+K, Na, CaSO$_4$+K, Na, Ca, R R=organic radical (anion)
A=exchange ion Experiments have shown that 110–130% ammonium salts, in relation to the quantity of cations adsorbed by the cation exchanger, is sufficient for regeneration. It has also been shown that no outlay is necessary for the regeneration of the anion exchanger.

In consequence of the removal of organic substances and metal ions forming molasses, about 50–70% of the sugar previously going into molasses can be recovered from sugar solutions so treated.

An important side effect obtained is an extensive decolorization of the treated syrup and it is established that the decolorization stays, since in this process, as a consequence of the neutral exchange, there is no invert sugar formation and the formation of new dye, which is assumed to be formed from the invert sugar, does not occur.

The process according to the invention has therefore the following advantages in relation to those previously proposed:
(1) Removal of soluble non-sugars, with increase in the purity of the sugar solution.
(2) Regeneration of the anion exchanger without cost.
(3) Extensive decolorization of the syrup.
(4) Simplicity of apparatus as a result of the combination of several processes.
(5) Omission of the very costly cooling of the sugar solution to be treated.
(6) Avoidance of the use of mineral acids and alkalis in the practice of the sugar industry.
(7) Use of the cheap ammonium salts as the only purifying material.

Practical examples of the invention will now be described by way of illustration only.

Example I

A technical sugar solution, for example pre-refined thin juice, is percolated through an exchange column, which contains an extensive quantity of cation exchanger in the ammonium form and anion exchanger in the sulphate form, in the proportion of 1:1 for example, the anion exchanger being so chosen that it tolerates a temperature of 100° C. and also has a specific weight 10% lighter than the cation exchanger.

The stratification is selected so that the anion exchanger lies upon the cation exchanger. The working temperature should lie between 80 and 95° C.

The emergent sugar solution should have a pH value close to that which it had before the treatment. The syrup is now treated with 0.2–0.3% of its volume of CaO and then saturated with carbon dioxide so that after boiling off the ammonia, its pH value should lie between 7.5–8.

The juice is then filtered to separate off the calcium sulphate formed. The exhausted exchanger is next washed and then treated with a hot solution containing 5–8% of a salt mixture comprising, for example, ammonium sulphate and 20% ammonium chloride. 100–150% of the ammonium salt theoretically necessary for the treatment of the cation exchanger is required. After washing out with water until the sulphate reaction disappears, the exchanger is ready to treat a fresh sugar solution.

Example II

A technical sugar solution, for example thin juice after the second saturation, is conveyed to the evaporating station and brought to a concentration of 60–65% T.S.

The thick juice so obtained is now percolated through an exchanger which contains a mixture consisting of an ammonium-charged cation exchanger and a sulphate-charged anion exchanger. The temperature should be between 70 and 95° C.

The thick syrup obtained from the column is now treated with sufficient calcium hydroxide, in the form of milk of lime, to correspond to the replaceable cations, thus, for example, in a litre of thick juice containing 16 molecular equivalents of metal ions, $2 \times 160 = 320$ mol. equiv. $Ca(OH)_2 = 11.84$ g. are added. Of this quantity 160 mol. eq. are used in the formation of organic calcium salts and calcium sulphate, whilst the rest is salted out. The sludge so formed, consisting of calcium carbonate, calcium sulphate and insoluble calcium organic compounds is filtered off.

The thick juice now completely clear, has increased purity and is only slightly coloured.

Since the $CaSO_4$ is insoluble in sugar solutions having a concentration greater than 53%, the whole of the sulphate ions introduced into the syrup in place of the organic anions are removed.

Example III

The process described above can also be used with the cation and anion exchangers in two separate columns, which are charged in the manner described. The regeneration of the exhausted exchanger takes place with separate salt solutions, thus first with ammonium chloride, ammonium nitrate and then with a solution of ammonium sulphate.

Example IV

This example must be examined in conjunction with the accompanying drawing in order that the function and the layout of the plant can be more exactly understood.

A calcium-free technical thin juice is led, after the second saturation, over the anion exchanger which is charged with carbon ions. After going through the anion exchanger the thin juice is treated in the cation exchanger 2, which is charged with ammonium ions. The syrup then contains as a result ammonium carbonate or bicarbonate. This syrup is now treated in container 3 with an excess of calcium hydroxide, such that the ammonium carbonate in the syrup is decomposed into free ammonia and calcium carbonate. The calcium carbonate so formed passes with the excess calcium hydroxide still present into the saturator 4, where the excess calcium hydroxide is precipitated by treatment with carbon dioxide. The salted out solution is filtered in filter 5 and immediately concentrated in evaporator 6 and boiled down in the usual way. The vapour formed during the concentration, which contains ammonia formed during the reaction, is freed from ammonia in the distiller 7. The ammonia so formed passes into the saturator 8, where by treatment with carbon dioxide it again forms ammonium carbonate. The carbonate-ammoniacal solution so formed is used for the regeneration of both the anion and the cation exchangers. This process by means of a recycling operation, permits the regeneration of the exchangers without cost. By introduction of the carbonate ions, the need for reduction of the treatment temperature of the syrup is eliminated, so that it can be worked at normal treatment temperatures. Yet a further possibility for an increase in efficiency arises in that the waste liquors from the exchangers can be freed from ammonia by treatment with calcium hydroxide. In this way the recycling operation is almost without loss and higher efficiency is thus obtained.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. In a process of defecating and decolorizing pre-treated sugar solutions, the improvement which comprises establishing ion exchange contact between said solution and an anion exchange material charged with anions selected from the group consisting of carbonate and sulfate, whereby at least a portion of the anions in the solution is replaced by a member of said anion group, establishing ion exchange contact between said solution and a cation exchange material charged with ammonium, whereby at least a portion of the cations in the solution is replaced by ammonium, precipitating the anions in the solution thereafter with an alkaline earth metal compound and removing the insoluble alkaline earth metal salts thus obtained.

2. A process as claimed in claim 1, wherein said anion exchange material and said cation exchange material are arranged in a mixed bed.

3. A process of defecating pre-treated sugar solution, which comprises establishing ion exchange contact between said solution and an anion exchange material charged with anions selected from the group consisting of carbonate and sulfate, whereby at least a portion of the anions in the solution is replaced by a member of said anion group, establishing ion exchange contact between said solution and a cation exchange material, charged with ammonium, whereby at least a portion of the cations in the solution is replaced by ammonium, precipitating the anions in the solution thereafter with an alkaline earth metal compound, removing the insoluble alkaline earth metal salt thus obtained, regenerating the spent anion and cation exchange materials with an ammonium salt, and recharging said regenerated ion exchange materials with a fresh amount of solution.

4. A process as claimed in claim 3, wherein said ammonium salt comprises at least one member of the group consisting of ammonium sulfate, ammonium chloride and ammonium nitrate.

5. A process for the defecation of sugar solution which has previously been treated with lime and a carbonate-forming compound, which comprises percolating the pre-treated sugar solution through a cation exchange column charged with ammonium and an anion exchange column charged with sulfate, adding calcium oxide to the solution emanating from the columns, passing carbon dioxide through the solution, boiling the solution to a pH value of about between 7.5 to 8, and separating formed calcium sulfate.

6. In a process as claimed in claim 5, wherein said cation exchange material and said anion exchange material are arranged in a single column in a mixed bed.

7. In a process as claimed in claim 6, wherein said spent column is regenerated with ammonium sulfate and ammonium chloride.

8. A process for defecating sugar juice which comprises percolating the juice through a mixed bed containing a cation exchanger charged with ammonium and an anion exchanger charged with sulfate at a temperature of about between 70 to 95° C., treating the solution emanating from the mixed bed with an excess of calcium hydroxide and filtering the solution.

9. A process for defecating sugar juice free from calcium ions, which comprises passing the sugar juice over an anion exchange material charged with carbonate, passing the solution emanating from the anion exchanger over a cation exchange material charged with ammonium, treating the solution thus obtained with an excess of calcium hydroxide, whereby the ammonium carbonate in the solution is decomposed into free ammonia and calcium carbonate, removing calcium carbonate from the solution, concentrating the solution, whereby vapor is formed which contains ammonia, separating the ammonia from the vapor, contacting the liberated ammonia with carbon dioxide to form ammonium carbonate, and regenerating the anion and cation exchangers with said ammonium carbonate.

References Cited in the file of this patent

UNITED STATES PATENTS

| | | |
|---|---|---|
| 2,560,504 | Day et al. | July 10, 1951 |
| 2,666,741 | McMullen | Jan. 19, 1954 |
| 2,785,998 | Harding et al. | Mar. 19, 1957 |
| 2,812,300 | Pearson | Nov. 5, 1957 |
| 2,892,737 | Rohwer et al. | June 30, 1959 |
| 2,988,463 | Vajna | June 13, 1961 |